United States Patent
Yasuda et al.

(10) Patent No.: US 6,773,667 B2
(45) Date of Patent: Aug. 10, 2004

(54) HYDROGEN-OCCLUDING ALLOY AND PROCESS FOR PRODUCING THE SAME

(75) Inventors: Kiyotaka Yasuda, Hiroshima (JP); Yoshiki Sakaguchi, Hiroshima (JP); Shingo Kikugawa, Hiroshima (JP)

(73) Assignee: Mitsui Mining & Smelting Company, Ltd., Tokyo (JP)

( * ) Notice: Subject to any disclaimer, the term of this patent is extended or adjusted under 35 U.S.C. 154(b) by 206 days.

(21) Appl. No.: 10/019,058

(22) PCT Filed: May 8, 2001

(86) PCT No.: PCT/JP01/03830
§ 371 (c)(1),
(2), (4) Date: Dec. 27, 2001

(87) PCT Pub. No.: WO01/94653
PCT Pub. Date: Dec. 13, 2001

(65) Prior Publication Data
US 2002/0192153 A1 Dec. 19, 2002

(30) Foreign Application Priority Data
Jun. 9, 2000 (JP) ........................................ 2000-172952

(51) Int. Cl.$^7$ ............................. C22C 30/00; C21D 1/00
(52) U.S. Cl. ........................ 420/580; 148/148; 148/149; 148/559; 148/562
(58) Field of Search ................................. 420/580, 494; 148/419, 559, 562

(56) References Cited

U.S. PATENT DOCUMENTS 5,512,385 A * 4/1996 Komori et al. ............. 429/101

6,372,059 B1 * 4/2002 Yasuda et al. .............. 148/426

FOREIGN PATENT DOCUMENTS

| EP | 0 965 652 A1 | 12/1998 |
| EP | 0 955 386 A1 | 11/1999 |
| JP | A 9-213319 | 8/1997 |
| JP | A 11-152533 | 6/1999 |
| JP | 11-152533 | 6/1999 |
| JP | 11-310838 | 11/1999 |
| JP | 11-354116 | 12/1999 |
| JP | 2000-12012 | 1/2000 |
| JP | 2000-219928 | 8/2000 |

* cited by examiner

Primary Examiner—Daniel Jenkins
(74) Attorney, Agent, or Firm—Young & Thompson

(57) ABSTRACT

A hydrogen storage material which is an $AB_5$ type hydrogen storage alloy having a $CaCu_5$ type crystal structure represented by general formula:

$$MmNi_aMn_bAl_cCo_d$$

wherein Mm is a misch metal, $4.1 < a \leq 4.3$, $0.4 < b \leq 0.6$, $0.2 \leq c \leq 0.4$, $0.1 \leq d \leq 0.4$, and $5.2 \leq a+b+c+d \leq 5.45$, or general formula:

$$MmNi_aMn_bAl_cCo_dX_e$$

wherein Mm is a misch metal, X is Cu and/or Fe, $4.1 < a \leq 4.3$, $0.4 < b \leq 0.6$, $0.2 \leq c \leq 0.4$, $0.1 \leq d \leq 0.4$, $0 < e \leq 0.1$, and $5.2 \leq a+b+c+d+e \leq 5.45$, characterized in that the lattice length on the c-axis is 406.2 pm or more, and a process of producing the same.

7 Claims, No Drawings

HYDROGEN-OCCLUDING ALLOY AND PROCESS FOR PRODUCING THE SAME

TECHNICAL FIELD

The present invention relates to a hydrogen storage material and a process of producing the same. More particularly, it relates to a hydrogen storage material which is, while with a minimized cobalt content, excellent in insusceptibility to grain size reduction and hydrogen storage characteristics (PCT characteristics) and exhibits not only excellent initial activity that is an important characteristic for use in a battery but high output characteristics for use in electric tools, etc. or low-temperature characteristics for use in hybrid electric vehicles, and a process for producing the same.

BACKGROUND ART

Nickel-metal hydride storage batteries (secondary batteries) having a hydrogen storage material in the anode have recently been attracting attention as high capacity alkali storage batteries supplanting nickel-cadmium storage batteries. The hydrogen storage materials that are currently used widely are hydrogen storage alloys composed of five elements, i.e., Mm (misch metal, a mixture of rare earth elements), Ni, Al, Mn, and Co.

Compared with La-based alloys, the Mm—Ni—Mn—Al—Co alloys enable constructing an anode out of relatively cheap materials and provide closed nickel-metal hydride storage batteries having a long cycle life and a controlled inner pressure rise which is caused by gas generated in case of an overcharge and have therefore been used widely as an electrode material.

The Mm—Ni—Mn—Al—Co alloys in current use are designed to have a prolonged cycle life by preventing the alloys from reducing their grain size. It is generally known that about 10% by weight of Co (0.6 to 1.0 in an atomic ratio) is required to prevent the grain size reduction. It is also accepted that a given amount of Co is necessary for securing excellent hydrogen storage characteristics and anticorrosion.

However, the material cost increases with the Co content, which is problematical from the aspect of material cost. Taking into consideration application of the hydrogen storage material to large batteries, such as the power source of electric vehicles, and the ever expanding market of nickel-metal hydride storage batteries, in particular, the material cost is weighty in choosing anode materials and has been a matter of concern.

To settle the above problem, JP-A-9-213319 proposes altering the composition of the Mm—Ni—Mn—Al—Co alloy and adding thereto a small amount of an additional element. Use of the hydrogen storage material powder disclosed therein as an anode makes it feasible to reduce the Co content and yet to suppress deterioration of the anode caused by the alloy's reduction in grain size below a certain level and thereby to extend the cycle life of the battery.

Because the alloy of the composition disclosed in JP-A-9-323319 does not always secure stability in its characteristics, the present inventors have proposed in JP-A-11-152533 a composition and a production process for obtaining satisfactory initial activity, whereby a low-Co alloy has now come to be used in special applications.

However, where the hydrogen storage materials disclosed in the above publications (JP-A-9-213319 and JP-A-11-15253) are used, output characteristics, especially output in low temperature, are insufficient for electric tools needing high output characteristics or for hybrid electric vehicles.

Accordingly, an object of the present invention is to provide a hydrogen storage material of which the production cost is reduced by extremely decreasing its cobalt content and which exhibits excellent insusceptibility to grain size reduction, excellent hydrogen storage characteristics, satisfactory output characteristics, and satisfactory storage characteristics and a process for producing the same.

DISCLOSURE OF THE INVENTION

As a result of extensive studies, the present inventors have found that the above object is accomplished by a hydrogen storage material of AB structure having a specific nonstoichiometric composition (B site rich), particularly a composition having $4.1 < Ni \le 4.3$ and $0.4 < Mn \le 0.6$, and the c-axis of which is in a given range. They have also found that such a hydrogen storage material is obtainable with the above-described specific composition when a casting temperature and heat treating conditions satisfy a given relationship.

The present invention has been reached based on the above findings and provides a hydrogen storage material which is an $AB_5$ type hydrogen storage alloy having a $CaCu_5$ type crystal structure represented by general formula:

$$MmNi_aMn_bAl_cCo_d$$

wherein Mm is a misch metal, $4.1 < a \le 4.3$, $0.4 < b \le 0.6$, $0.2 \le c \le 0.4$, $0.1 \le d \le 0.4$, and $5.2 \le a+b+c+d \le 5.45$,
or general formula:

$$MmNi_aMn_bAl_cCo_dX_e$$

wherein Mm is a misch metal, X is Cu and/or Fe, $4.1 < a \le 4.3$, $0.4 < b \le 0.6$, $0.2 \le c \le 0.4$, $0.1 \le d \le 0.4$, $0 < e \le 0.1$, and $5.2 \le a+b+c+d+e \le 5.45$, characterized in that the lattice length on the c-axis is 406.2 pm or more.

The present invention also provides a preferred process for producing the hydrogen storage material of the present invention which comprises heat-melting hydrogen storage alloy raw materials, casting the melt, and heat treating the resulting alloy in an inert gas atmosphere to produce an $AB_5$ type hydrogen storage material having a $CaCu_5$ type crystal structure represented by the following general formulae, characterized in that the casting temperature is 1350 to 1550° C., the pouring temperature is 1200 to 1450° C., and conditions of said heat treating are 1040 to 1080° C. and 1 to 6 hours.

General formula:

$$MmNi_aMn_bAl_cCo_d$$

wherein Mm is a misch metal, $4.1 < a \le 4.3$, $0.4 < b \le 0.6$, $0.2 \le c \le 0.4$, $0.1 \le d \le 0.4$, and $5.2 \le a+b+c+d \le 5.45$,
or general formula:

$$MmNi_aMn_bAl_cCo_dX_e$$

wherein Mm is a misch metal, X is Cu and/or Fe, $4.1 < a \le 4.3$, $0.4 < b \le 0.6$, $0.2 \le c \le 0.4$, $0.1 \le d \le 0.4$, $0 < e \le 0.1$, and $5.2 \le a+b+c+d+e \le 5.45$.

The Best Mode For Carrying Out The Invention:

The hydrogen storage material according to the present invention is an $AB_5$ type hydrogen storage alloy having a $CaCu_5$ type crystal structure represented by general formula:

$$MmNi_aMn_bAl_cCo_d$$

wherein Mm is a misch metal, $4.1 < a \le 4.3$, $0.4 < b \le 0.6$, $0.2 \le c \le 0.4$, $0.1 \le d \le 0.4$, and $5.2 \le a+b+c+d \le 5.45$,
or general formula:

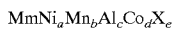

wherein Mm is a misch metal, X is Cu and/or Fe, $4.1 < a \leq 4.3$, $0.4 < b \leq 0.6$, $0.2 \leq c \leq 0.4$, $0.1 \leq d \leq 0.4$, $0 < e \leq 0.1$, and $5.2 \leq a+b+c+d+e \leq 5.45$.

In the above formulae, Mm is a misch metal, a mixture of rare earth elements such as La, Ce, Pr, Nd, and Sm. The hydrogen storage material is an $AB_5$ type hydrogen storage alloy having a $CaCu_5$ type crystal structure having a B site-rich nonstoichiometric composition ranging from $AB_{5.2}$ to $AB_{5.45}$.

In this hydrogen storage material, the compositional ratio (atomic ratio) of $Ni_a Mn_b Al_c Co_d$ fulfills the following relationships. The ratio of Ni: $4.1 < a \leq 4.3$. The ratio of Mn: $0.4 < b \leq 0.6$. The ratio of Al: $0.2 \leq c \leq 0.4$. The ratio of Co: $0.1 \leq d \leq 0.4$. $(a+b+c+d)$ is in a range of from 5.2 to 5.45.

The compositional ratio (atomic ratio) of $Ni_a Mn_b Al_c Co_d X$, (wherein X is Cu and/or Fe) satisfies the following relationships. The ratio of Ni: $4.1 < a \leq 4.3$. The ratio of Mn: $0.4 < b \leq 0.6$. The ratio of Al: $0.2 \leq c \leq 0.4$. The ratio of Co: $0.1 \leq d \leq 0.4$. The ratio of X: $0 < e \leq 0.1$. $(a+b+c+d+e)$ is in a range of from 5.2 to 5.45.

As described above, the ratio of Ni, a, is more than 4.1 and up to 4.3, desirably from 4.15 to 4.25. If a is 4.1 or less, the output characteristics are not satisfactory. If it exceeds 4.3, deterioration in insusceptibility to grain size reduction or life characteristics is observed.

The ratio of Mn, b, is more than 0.4 and up to 0.6. If b is 0.4 or less, the plateau pressure increases, and the hydrogen storage capacity is reduced. If it exceeds 0.6, the alloy undergoes considerable corrosion so that the battery voltage greatly decreases during storage.

The ratio of Al, c, is from 0.2 to 0.4. If c is smaller than 0.2, the plateau pressure, which is the hydrogen release pressure of a hydrogen storage material, increases to deteriorate energy efficiency in charges and discharges. If it exceeds 0.4, the hydrogen storage capacity is reduced.

The ratio of Co, d, is 0.1 to 0.4. If d is less than 0.1, the hydrogen storage characteristics or the resistance to grain size reduction are deteriorated. If it exceeds 0.4, the proportion of Co increases, failing to realize cost reduction.

The ratio of X, e, is from 0 to 0.1. If e is more than 0.1, the output characteristics are impaired, and the hydrogen storage capacity is reduced.

$(a+b+c+d)$ or $(a+b+c+d+e)$ (these sums will hereinafter be sometimes referred to as x, inclusively) is from 5.2 to 5.45. If x is smaller than 5.2, the battery life and the resistance to grain size reduction are ruined. If x is greater than 5.45, the hydrogen storage characteristics are reduced and, at the same time, the output characteristics are also deteriorated.

The hydrogen storage material of the present invention has a lattice length on the c-axis of 406.2 pm or more, preferably 406.6 to 407.1 pm. If the lattice length on the c-axis is shorter than 406.2 pm, the alloy has poor insusceptibility to grain size reduction and reduced battery life characteristics.

The c-axis lattice length of the hydrogen storage material has different preferred ranges according to the value of $(a+b+c+d)$ or $(a+b+c+d+e)$, i.e., the value x. The value x being 5.02 or greater and smaller than 5.3, the c-axis lattice length is preferably 406.2 to 406.8 pm. The value x ranging from 5.3 to 5.45, the c-axis lattice length is preferably 406.8 to 407.3 pm.

Although the lattice length on the a-axis of the hydrogen storage material of the present invention is not particularly limited, it is usually from 500.5 to 501.2 pm.

The process of producing the hydrogen storage material of the present invention is then described. Raw materials of the hydrogen storage material are weighed to give the alloying composition described above and mixed up. The mixture is melted into a melt by means of a high frequency induction furnace based on induction heating. The melt is poured into a casting mold, for example, a mold of water cooling type at a casting temperature of 1350 to 1550° C. to obtain a hydrogen storage material. The pouring temperature is 1200 to 1450° C. The term "casting temperature" as used herein means the temperature of the melt in the crucible at the beginning of casting, and the term "pouring temperature" means the temperature of the melt at the inlet of the casting mold (i.e., the temperature of the melt before entering the casting mold).

The resulting hydrogen storage material is heat treated in an inert gas atmosphere, for example, in argon gas under heat treating conditions of 1040 to 1080° C. and 1 to 6 hours. A cast alloy structure usually shows fine grain boundary segregation chiefly of Mn. The heat treatment is to level the segregation by heating.

There is thus obtained a hydrogen storage material which has a reduced cobalt content and yet exhibits excellent insusceptibility to grain size reduction, excellent hydrogen storage characteristics, satisfactory output characteristics, and satisfactory storage characteristics.

The hydrogen storage material is crushed, pulverized, and subjected to surface treatment, such as an acid treatment, an alkali treatment or a like treatment and is suitably used as an anode of high-output alkali storage batteries. The alkali storage batteries thus provided are satisfactory in initial characteristics and low-temperature high-output characteristics. The anode made of the hydrogen storage material is prevented from deterioration due to the alloy getting finer and therefore secures a long cycle life.

The present invention will further be illustrated in the concrete by way of Examples and the like.

EXAMPLES 1 TO 8, REFERENCE EXAMPLES 1 TO 2, AND COMPARATIVE EXAMPLES 1 TO 4

Raw materials of a hydrogen storage material were weighed to make the alloying composition shown in Table 1 and mixed up. The mixture was put in a crucible, and the crucible was set in a high frequency melting furnace. After evacuating to a degree of vacuum of 10 to $10^{-5}$ Torr, the mixture was heat melted in an argon gas atmosphere and cast into a copper casting mold of water cooling type at 13500C (pouring temperature: 1250° C.) to obtain an alloy. The resulting alloy was heat treated in an argon atmosphere under the conditions shown in Table 2 to obtain a hydrogen storage material. Reference Example 1 shows the characteristics of a conventional alloy having a Co content of 10 wt %, and Reference Examples 2-1 and 2-2 show the characteristics of conventional alloys having a Co content of 5 wt %.

Evaluation of Characteristics

The lattice length, PCT capacity, grain size retention, storage anticorrosion, output, and electrode life of the hydrogen storage materials obtained in Examples and Comparative Examples were determined in accordance with the following methods. The results obtained are shown in Table 2.

Lattice length

Measured by powder X-ray diffractometry using CuKα rays.

PCT Capacity

Calculated from the hydrogen absorption measured at 45° C. H/M: 0 to 0.5 MPa.

Grain Size Retention

Hydrogen gas of 30 bar was introduced into the hydrogen storage material having a grain size adjusted to 22 to 53 microns in a PCT apparatus to make the material absorb hydrogen, followed by hydrogen desorption. The hydrogen absorption and desorption were repeated 10 cycles, and the ratio of the average grain size after the cycle test to that before the cycle test was obtained.

Corrosion in Storage (1) Total Corrosion

A corrosion behavior in storage was evaluated as follows. A classified hydrogen storage material powder was made to absorb hydrogen once for activation by use of a cell for PCT evaluation. The cell was put into an aqueous KOH solution having a specific gravity of 1.30 and left to stand as such at 80° C. for 4 hours to conduct a dissolution test. The amount of the precipitate on the surface and the amount of dissolved alloy components were determined to give a total corrosion. The total corrosion was relatively expressed in terms of an index based on that of Reference Example 1 taken as 100.

(2) VSM (Vibration Sample Magnetometer) Value

After the determination of the total corrosion, the magnetization of the alloy attributed to Ni and Co on the alloy powder surface was measured with a VSM, which was evaluated as an indication of the degree of corrosion.

Preparation of Electrode Cell

A powdered hydrogen storage material having a grain size adjusted to 22 to 53 microns was mixed with prescribed amounts of a conductive agent and a binder. The mixed powder was pressed into a pellet electrode, which was used as an anode. The pellet anode was combined with a cathode having a sufficient capacity (sintered nickel hydroxide) with a separator interposed therebetween. The combined electrodes were dipped in a KOH aqueous solution having a specific gravity of 1.30 to prepare a model cell.

Setting of Charge and Discharge Conditions

1) For Measurement of Output Characteristics

Charge: 0.2 C.—130%; Discharge: 1 C.—0.7V (cut-off)
Temperature: 0° C.

2) For life test

Charge: 2 C./3-1 h; Discharge: 2 C./3-1 h
Cycle: 100 cycles

Output

After the initial activation, a low-temperature and high-rate discharge capacity (0° C., 1 C.) was measured under the above-described conditions.

Electrode Life

After the above-described life test, the cell was subjected to a charge at 0.2 C.-130% followed by a discharge at 0.2 C.-0.7 V cut-off to measure the discharge capacity. A ratio of the measured discharge capacity to the initial discharge capacity after the activation was evaluated as a capacity retention.

TABLE 1

|  | B/A | Mm | Ni | Mn | Al | Co | Fe | Cu |
|---|---|---|---|---|---|---|---|---|
| Ref. Example 1 | 5.0 | 1 | 3.55 | 0.4 | 0.3 | 0.75 | — | — |
| Ref. Example 2 | 5.2 | 1 | 4.00 | 0.4 | 0.3 | 0.4 | — | 0.1 |
| Example 1 | 5.3 | 1 | 4.2 | 0.5 | 0.3 | 0.3 | — | — |
| Example 2 | 5.25 | 1.01 | 4.2 | 0.5 | 0.3 | 0.3 | — | — |
| Example 3 | 5.20 | 1.02 | 4.2 | 0.5 | 0.3 | 0.3 | — | — |
| Example 4 | 5.35 | 0.99 | 4.2 | 0.5 | 0.3 | 0.3 | — | — |
| Example 5 | 5.41 | 0.98 | 4.2 | 0.5 | 0.3 | 0.3 | — | — |
| Comp. Example 1 | 5.15 | 1.03 | 4.2 | 0.5 | 0.3 | 0.3 | — | — |
| Comp. Example 2 | 5.46 | 0.97 | 4.2 | 0.5 | 0.3 | 0.3 | — | — |
| Example 6 | 5.3 | 1 | 4.2 | 0.5 | 0.3 | 0.2 | — | 0.1 |
| Example 7 | 5.3 | 1 | 4.2 | 0.5 | 0.3 | 0.2 | 0.1 | — |
| Example 8 | 5.3 | 1 | 4.2 | 0.6 | 0.2 | 0.3 | — | — |
| Comp. Example 3 | 5.2 | 1 | 4.3 | 0.2 | 0.4 | 0.3 | — | — |
| Comp. Example 4 | 5.0 | 1 | 4.1 | 0.3 | 0.3 | 0.3 | — | — |

TABLE 2

| | Heat Treatment (° C./hr) | Lattice Length (a/pm) | Lattice Length (c/pm) | PCT Capacity (H/M) | Grain Size Retention (%) | Corrosion in Storage VSM | Corrosion in Storage Total | Output (mAh/g) | Electrode Life (%) |
|---|---|---|---|---|---|---|---|---|---|
| Ref. Example 1 | 1060-3 | 499.1 | 405.6 | 0.82 | 92 | 3.22 | 100 | 220 | 97 |
| Ref. Example 2-1 | 1060-3 | 500.9 | 406.3 | 0.82 | 92 | 2.21 | 130 | 180 | 96.5 |
| Ref. Example 2-2 | 1080-3 | 500.9 | 406.4 | 0.82 | 93 | 2.10 | 120 | 170 | 97 |
| Example 1-1 | 1040-3 | 501.1 | 406.5 | 0.82 | 95 | 1.90 | 85 | 210 | 98 |
| Example 1-2 | 1060-3 | 500.9 | 406.7 | 0.81 | 99 | 1.50 | 65 | 220 | 99 |
| Example 1-3 | 1080-3 | 500.9 | 406.6 | 0.81 | 98 | 1.73 | 78 | 215 | 97.5 |
| Comp. Example 1-1 | 1020-3 | 501.3 | 406.0 | 0.83 | 77 | 2.35 | 145 | 220 | 87 |
| Comp. Example 1-2 | 1100-3 | 501.2 | 406.1 | 0.83 | 83 | 2.20 | 120 | 190 | 88 |
| Example 2 | 1060-3 | 501.3 | 406.5 | 0.83 | 95 | 2.00 | 95 | 215 | 97 |
| Example 3 | 1060-3 | 501.5 | 406.4 | 0.85 | 93 | 2.10 | 100 | 225 | 96.5 |
| Example 4 | 1060-3 | 500.6 | 406.9 | 0.80 | 99 | 1.45 | 60 | 175 | 99 |
| Example 5 | 1060-3 | 500.5 | 407.0 | 0.79 | 99 | 1.40 | 50 | 170 | 98 |
| Example 6 | 1060-3 | 500.9 | 406.6 | 0.81 | 97 | 1.75 | 90 | 210 | 97 |
| Example 7 | 1060-3 | 500.7 | 406.8 | 0.80 | 98 | 2.05 | 100 | 195 | 98 |
| Example 8 | 1060-3 | 501.2 | 406.8 | 0.83 | 94 | 2.05 | 95 | 225 | 97 |
| Comp. Example 3 | 1060-3 | 500.5 | 407.3 | 0.75 | 94 | 2.74 | 140 | 120 | 94 |
| Comp. Example 4 | 1060-3 | 500.7 | 404.9 | 0.83 | 65 | 2.95 | 160 | 190 | 89 |

As is apparent from the results in Table 2, Examples show higher levels of grain size retention, battery output and electrode life in good balance than Comparative Examples. It is also understood that Examples have a lower magnetization and a less total corrosion than Comparative Examples, being proved superior in storage characteristics and life as a battery. Further, Examples are generally equal to Reference Examples in terms of PCT capacity, battery output and electrode life and superior in grain size retention and anticorrosion during storage.

Industrial Applicability

The hydrogen storage material of the present invention has an extremely reduced cobalt content and therefore enjoys a reduction in production cost. It is excellent in resistance against grain size reduction and hydrogen storage characteristics and satisfactory in output characteristics and storage characteristics.

The production process according to the present invention provides the above-described hydrogen storage material stably and efficiently.

What is claimed is:

1. A hydrogen storage material which is an $AB_5$ type hydrogen storage alloy having a $CaCu_5$ type crystal structure represented by general formula:

$$MmNi_aMn_bAl_cCo_d$$

wherein Mm is a misch metal, $4.1<a\leq 4.3$, $0.4<b\leq 0.6$, $0.2\leq c\leq 0.4$, $0.1\leq d\leq 0.4$, and $5.2\leq a+b+c+d\leq 5.45$, characterized in that the lattice length on the c-axis is 406.2 pm or more.

2. A hydrogen storage material which is an $AB_5$ type hydrogen storage alloy having a $CaCu_5$ type crystal structure represented by general formula:

$$MmNi_aMn_bAl_cCo_dX_e$$

wherein Mm is a misch metal, X is Cu and/or Fe, $4.1<a\leq 4.3$, $0.4<b\leq 0.6$, $0.2\leq c\leq 0.4$, $0.1\leq d\leq 0.4$, $0<e\leq 0.1$, and $5.2\leq a+b+c+d+e\leq 5.45$, characterized in that the lattice length on the c-axis is 406.2 pm or more.

3. The hydrogen storage material according to claim 1, wherein said lattice length on the c-axis is from 406.6 to 407.1 pm.

4. The hydrogen storage material according to claim 1, wherein (a+b+c+d) or (a+b+c+d+e) is 5.2 or greater and smaller than 5.3, and said lattice length on the c-axis is 406.2 or greater and smaller than 406.8 pm.

5. The hydrogen storage material according to claim 1, wherein (a+b+c+d) or (a+b+c+d+e) is from 5.3 to 5.45, and said lattice length on the c-axis is from 406.8 to 407.3 pm.

6. A process for producing a hydrogen storage material comprising heat-melting raw materials of a hydrogen storage material, casting the melt, and heat treating the cast product in an inert gas atmosphere to produce an $AB_5$ type hydrogen storage material having a $CaCu_5$ type crystal structure represented by the following general formulae, characterized in that the casting temperature is 1300 to 1550° C., the pouring temperature is 1200 to 1450° C., and conditions of said heat treating are 1040 to 1080° C. and 1 to 6 hours.

General formula:

$$MmNi_aMn_bAl_cCo_d$$

wherein Mm is a misch metal, $4.1<a\leq 4.3$, $0.4<b\leq 0.6$, $0.2\leq c\leq 0.4$, $0.1\leq d\leq 0.4$, and $5.2\leq a+b+c+d\leq 5.45$.

7. A process for producing a hydrogen storage material comprising heat-melting raw materials of a hydrogen storage material, casting the melt, and heat treating the cast product in an inert gas atmosphere to produce an $AB_5$ type hydrogen storage material having a $CaCu_5$ type crystal structure represented by the following general formulae, characterized in that the casting temperature is 1300 to 1550° C., the pouring temperature is 1200 to 1450° C., and conditions of said heat treating are 1040 to 1080° C. and 1 to 6 hours.

General formula:

$$MmNi_aMn_bAl_cCo_dX_e$$

wherein Mm is a misch metal, X is Cu and/or Fe, $4.1<a\leq 4.3$, $0.4<b\leq 0.6$, $0.2\leq c\leq 0.4$, $0.1\leq d\leq 0.4$, $0<e\leq 0.1$, and $5.2\leq a+b+c+d+e\leq 5.45$.

* * * * *

UNITED STATES PATENT AND TRADEMARK OFFICE
CERTIFICATE OF CORRECTION

PATENT NO. : 6,773,667 B2
DATED : August 10, 2004
INVENTOR(S) : Kiyotaka Yasuda et al.

It is certified that error appears in the above-identified patent and that said Letters Patent is hereby corrected as shown below:

Title page,
Under [57], ABSTRACT, amend "7 claims, No Drawings" to -- 10 claims, No Drawings --.

Column 8,
Line 37, please add the following claims 8-10, as follows:
-- 8. The hydrogen storage material according to claim 2, wherein said lattice length on the c-axis is from 406.6 to 407.1 pm.

9. The hydrogen storage material according to claim 2, wherein (a+b+c+d) or (a+b+c+d+e) is 5.2 or greater and smaller than 5.3, and said lattice length on the c-axis is 406.2 or greater and smaller than 406.8 pm.

10. The hydrogen storage material according to claim 2, wherein (a+b+c+d) or (a+b+c+d+e) is from 5.3 to 5.45, and said lattice length on the c-axis is from 406.8 to 407.3 pm. --

Signed and Sealed this

Eighth Day of February, 2005

JON W. DUDAS
*Director of the United States Patent and Trademark Office*